United States Patent [19]

Vicker

[11] Patent Number: 5,134,924
[45] Date of Patent: Aug. 4, 1992

[54] AUTOMATIC COFFEE OR LIKE BEVERAGE MAKING MACHINE

[76] Inventor: Wayne Vicker, 2480 SW. 57th Ter., Hollywood, Fla. 33023

[21] Appl. No.: 502,817

[22] Filed: Apr. 2, 1990

[51] Int. Cl.⁵ ........................ A47J 31/34; A47J 31/30
[52] U.S. Cl. .................................. 99/280; 99/289 R; 99/295; 99/302 R
[58] Field of Search ................. 99/279, 280, 281, 282, 99/283, 286, 287, 289 R, 289 T, 289 D, 289 P, 295, 297, 300, 302 R, 302 P; 426/433, 335

[56] References Cited

U.S. PATENT DOCUMENTS

| 3,356,011 | 12/1967 | Parraga | 99/289 T |
| 3,812,273 | 5/1974 | Heinrich | 426/433 |
| 4,389,925 | 6/1983 | Piana | 99/289 R |

FOREIGN PATENT DOCUMENTS 1338260 8/1963 France ........................... 99/289 R
934152 8/1963 United Kingdom ............. 99/289 R Primary Examiner—Robert W. Jenkins
Attorney, Agent, or Firm—Malloy, Downey & Malloy

[57] ABSTRACT

A machine for the automatic making of coffee or like beverages from a plurality of preformed packets wherein each packet is successively delivered to a liquid delivery head and further a plurality of containers are each disposed in receiving relation with water flowing through individual ones of said plurality of packets from the delivery head for the collection of the formed beverage. A control assembly is provided to automatically regulate the synchronized movement of the delivery head into engaging relation with successively positioned packets and the supplying of liquid thereto at a predetermined time and in a predetermined quantity so that each packet, when successively and operatively positioned will form the correct amount of coffee in the aligned container.

16 Claims, 4 Drawing Sheets

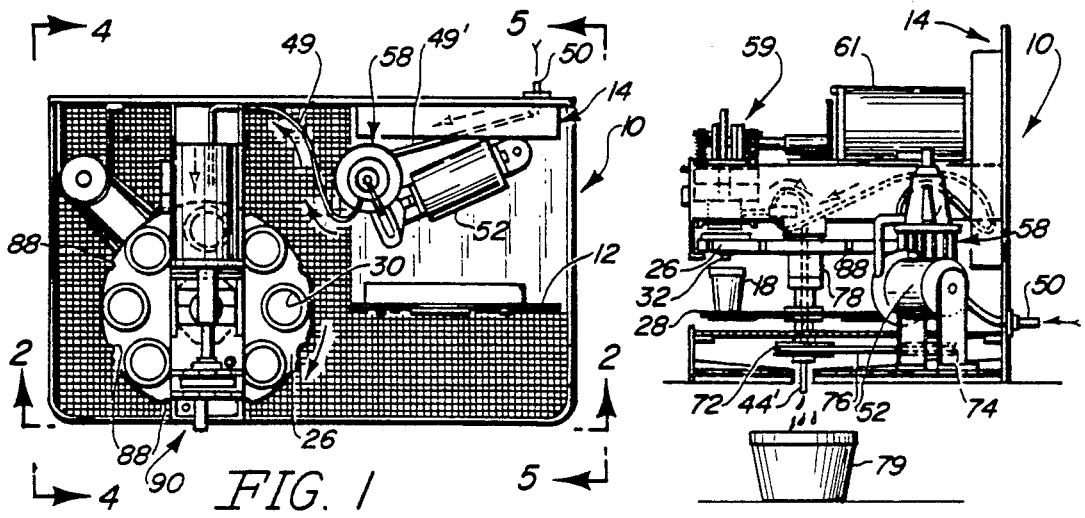
FIG. 1
FIG. 5
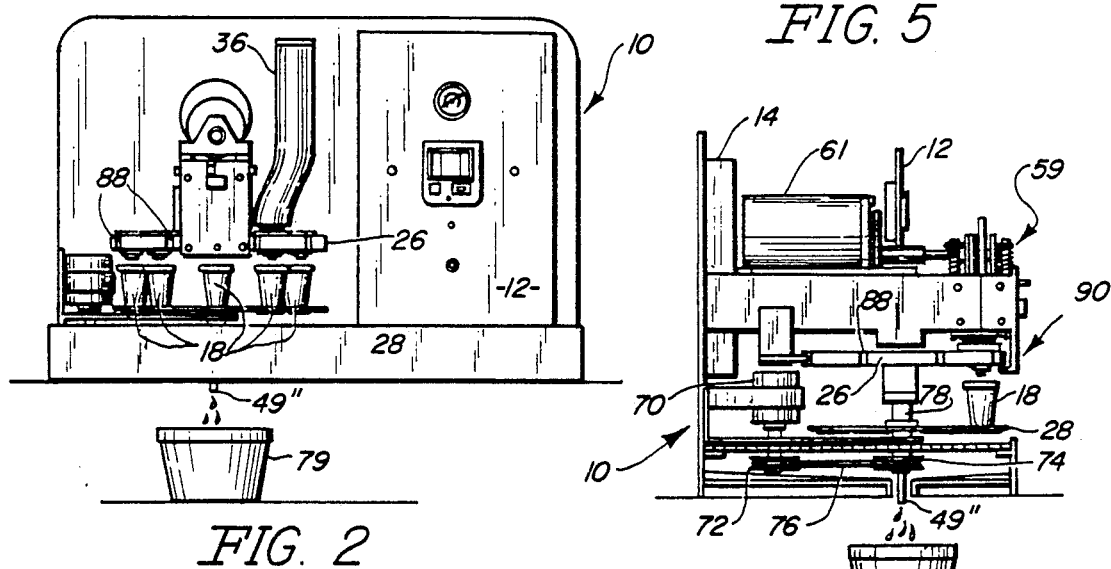
FIG. 2
FIG. 4
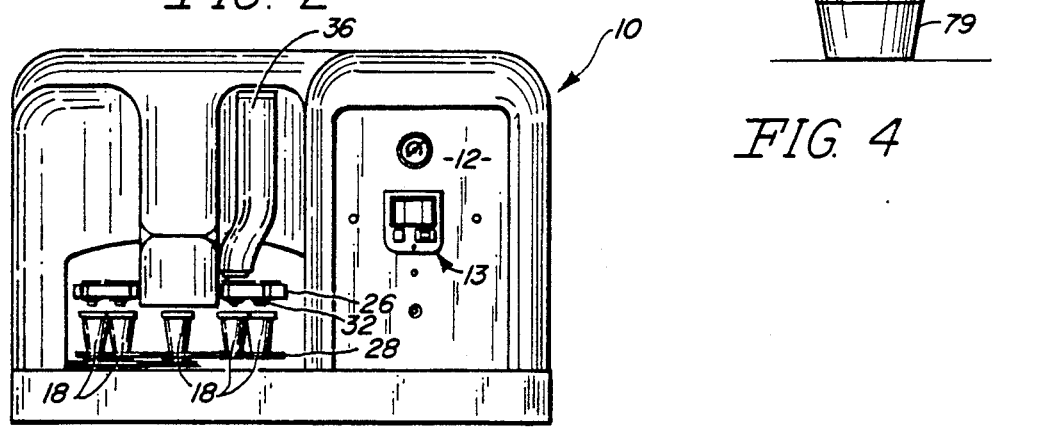
FIG. 3

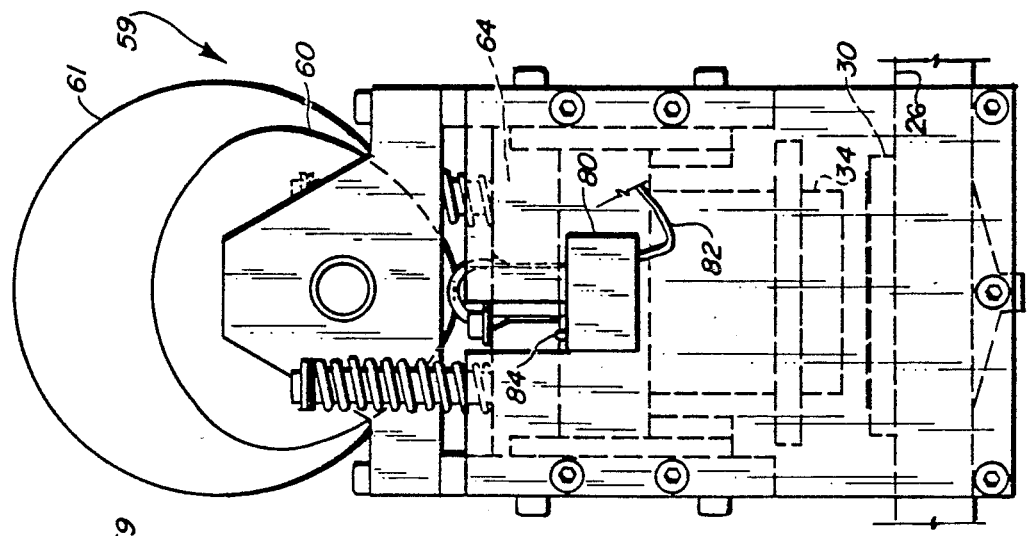
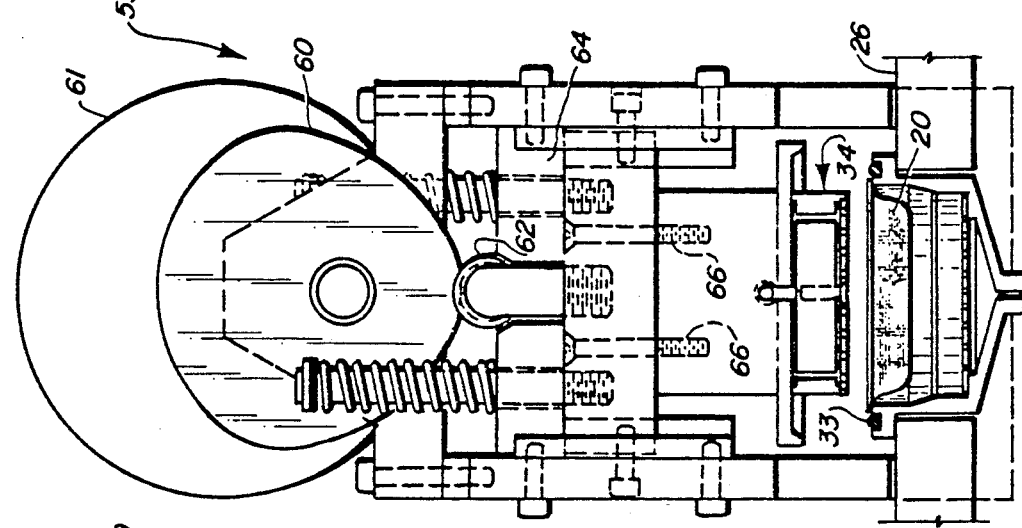
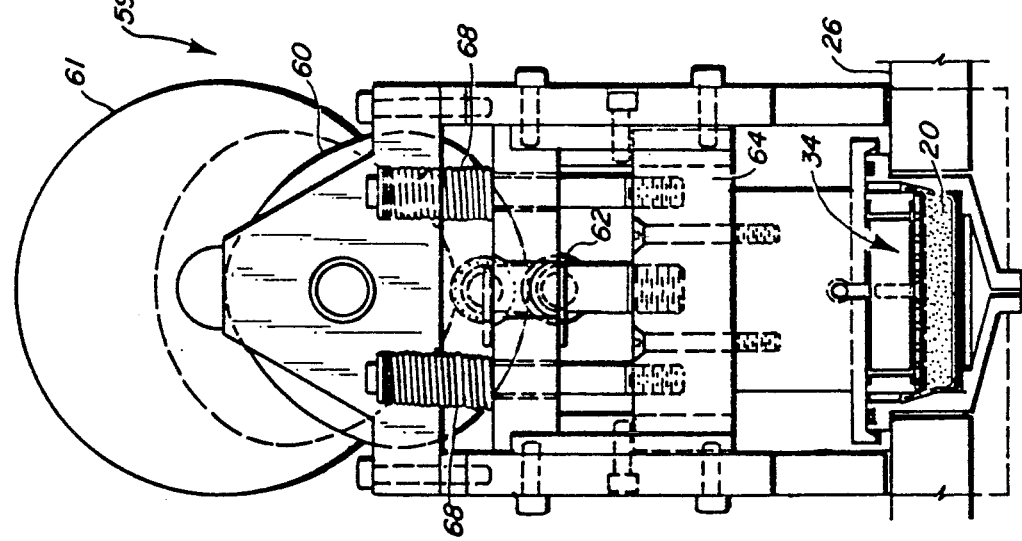

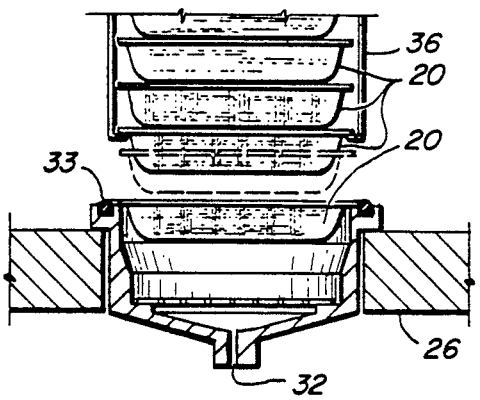
FIG. 10
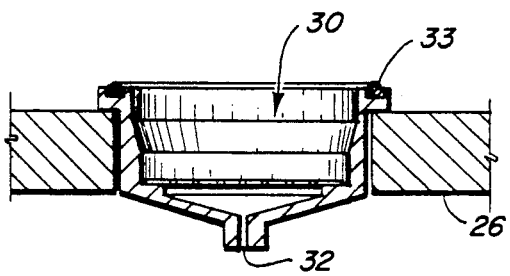
FIG. 9
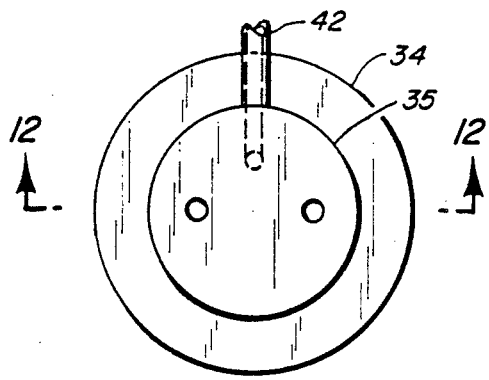
FIG. 11
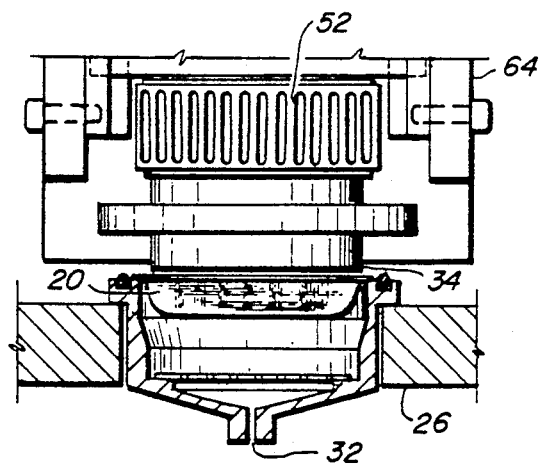
FIG. 18
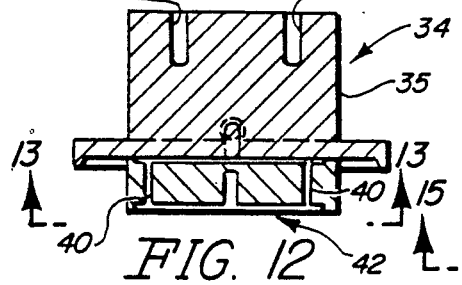
FIG. 12
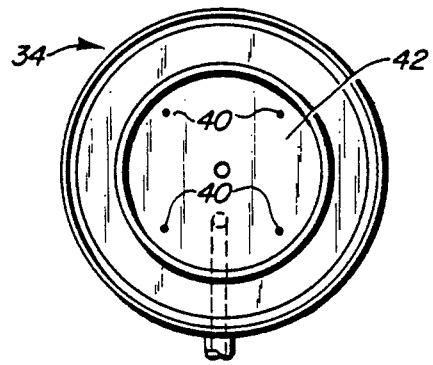
FIG. 13
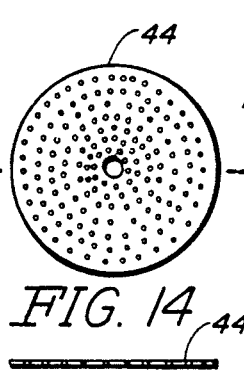
FIG. 14
FIG. 15
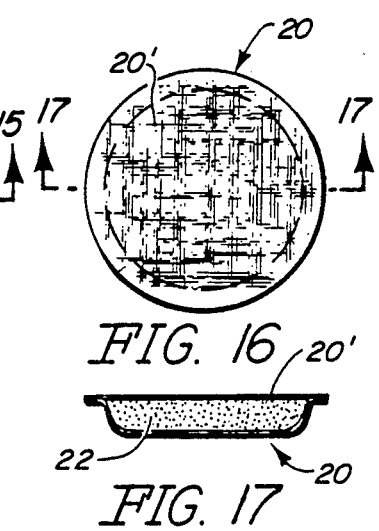
FIG. 16
FIG. 17

AUTOMATIC COFFEE OR LIKE BEVERAGE MAKING MACHINE

BACKGROUND OF THE INVENTION

1. Field of the Invention

This invention relates to an assembly for the automatic or semi-automatic production of a beverage, primarily but not necessarily, a coffee beverage wherein water or applicable liquid is directed under pressure successively into contact with a plurality of pre-formed packets of powder, granulated or like material which forms the beverage when saturated with water.

2. Description of the Prior Art

Popularity and wide acceptance by consumers of coffee has been known for many years. Conventionally, coffee is prepared utilizing relatively expensive and specialized equipment especially when such coffee is prepared on an individual basis for use and sale in commercial establishments such as restaurants. In addition, it is known that preparation time is rather lengthy especially when producing many relatively small quantities or individual containers of this beverage. Specialized equipment and lengthy preparation time may be generally acceptable for private or in-home consumption or where the clientele of a given establishment expects to pay a rather high price for such beverage. However, the popularity of this beverage has resulted in an increased demand for coffee in public facilities such as but not limited to fast food restaurants. The assembly of the present invention, to be described in greater detail hereinafter, is primarily designed for relatively high volume utilization but is also readily adaptable for home use.

While coffee has been prepared and served in restaurants for sometime, the aforementioned problems concerned with the expense and the equipment and the lengthy time of preparation is looked upon as a great inconvenience to operators of a restaurant. In order to facilitate service in such public facilities, it is of course desirable that all ordered food stuffs including coffee and like coffee beverages be served to the clientele as soon as possible after ordering. This generally results in the preparation of large quantities of coffee which is then stored during constant heating for a significant brief period. Frequently, such preparation and storage of relatively large quantities of this beverage results in waste when sufficient individual servings are not ordered by the clientele or a deterioration in taste. Also, when the proprietor of a restaurant or like public facility prepares an "expresso" type coffee on an individual basis, there is normally a disagreeably long amount of time that elapses from the time of ordering to the time of serving.

There is a recognized need in the restaurant and related industries for a device capable of producing individual, servings of predetermined and variable quantities of coffee in a relatively short period of time but which maintains the high quality which most consumers have come to expect and recognize. Such an intended device should be structured to produce or prepare a coffee beverage preferably from a preformed packet having a high quality normally associated with more conventional equipment. In addition, such a device should be relatively inexpensive, easy to maintain and operate and include sufficient structural integrity to have a long operable life.

SUMMARY OF THE INVENTION

The present invention relates to an automatic or at least semi-automatic coffee or like beverage making machine which is designed to form the preferred beverage from a plurality of preformed packets. More specifically, each of the packets are designed to produce one "serving" wherein the size of the packet and the amount of water or other applicable liquid fed to the packet and allowed to pass therethrough will determine the quantity of each serving. In the subject assembly, a housing includes a first rotatable plate defining a packet carrying member mounted thereon. A second plate is structured to hold a plurality of containers in aligned relation with each of a plurality of packets maintained on the packet carrying member or plate. These plates holding the packets and the container are designed to rotate in synchronization with one another by an electrically powered drive motor. A first plurality of pockets are formed in the first packet carrying plate and each of the pockets are configured and dimensioned to removably hold a packet therein. Also, these pockets are structured to allow water to pass through the packet and the pocket into an aligned container. A delivery head is reciprocally mounted to engage each of the packets successively as they are rotated into aligned position therewith. The reciprocal movement of the delivery head allows it to be moved into and out of an engaging, compressing relation with each of the successively disposed and aligned packets as they each pass beneath the delivery head.

A supply of water or like liquid is forced primarily by a pump means from a conventional liquid or water supply to the delivery head and through each of the packets by a fluid delivery means. Such delivery means may include a conduit means to specifically direct water from the liquid supply, under pressure of the pump means, to the delivery head and more specifically to a plurality of integrally formed channels within the head. These channels are disposed to equally disperse the liquid passing through the delivery head into the packets. The water passes through the individual packets, saturating the contents thereof, through the pockets in which they are formed. The formed beverage then passes into the aligned containers located immediately below and in fluid receiving relation to each of the packets. A first drive means serves to synchronize reciprocal movement of the delivery head into and out of the aforementioned engaging position with each of the packets so that the water adequately flows through each packet allowing the beverage to be formed by saturating the contents of the packets.

The fluid delivery means further includes a valve means which serves to regulate liquid or fluid flow from the liquid supply, under pressure of the pump means, to the delivery head. In addition, the delivery head is maintained in its engaging or compressed position relative to the packet so as to remove any excess water and/or steam, fluid, moisture, etc. from the packet after the vast majority of the liquid passes therethrough into the aligned container. This is accomplished by moving the aforementioned regulating valve to an open position allowing removal of any of the excess moisture or drain fluid from the packets. The conduit means associated with the fluid delivery means serves to remove this drain fluid from the delivery head to a drain or collection facility.

Heating means is provided preferably at two locations on the housing. A first heating means is located in direct heat transferring and conducting relation to the delivery head which is preferably formed of a substantially solid, one piece construction of heat conducting material such as metal. A second heating means is located downstream of the pump means and input of the liquid supply such that this liquid is effectively "preheated" by passing through a circuitous route in heat receiving relation to a second heating means. The preheated water then passes through the aforementioned conduit means and the regulating valve structure to the delivery head where it is again heated by the first heating means to insure that the water is at the proper temperature as it passes through and saturates the granulated supply of dry material maintained in the preformed packets.

An important feature of the present invention is the existence of a control means which allows the user of the subject assembly to form any number of cups or containers of coffee or like beverage automatically just by applying, through any type of conventional digital control or applicable structure the required or desired number of containers. The packet carrying member or plate as well as the container carrying member located immediately beneath such packet plate is preferably designed to have a capacity to removably support eight packets and eight aligned containers for receiving the beverage to be formed. However, the user can select the formation of any lesser number of containers or quantity to be formed in the same automatic fashion.

A control means more importantly includes a switching means and a timing means which serve to regulate the reciprocal position of the delivery head into its engaging position with each of the packets successively and the amount of "downtime" during which the delivery head will be maintained in such engaging position. Such time must be sufficient to allow the correct amount of water to pass from the pump means through the delivery head and therefrom through each of the packets to form the desired beverage. In addition, the downtime must be sufficient to allow the removal of any waste fluid such as steam, moisture, water, etc. from the packet, as set forth above. In addition, the timing and control means are cooperatively structured and interconnected to activate the feeding of water to the delivery head at the proper time and in the proper quantities.

BRIEF DESCRIPTION OF THE DRAWINGS

For a fuller understanding of the nature of the present invention reference should be had to the following detailed description taken in connection with the accompanying drawings in which:

FIG. 1 is a top plan view of the assembly of the present invention.

FIG. 2 is a front view of the embodiment of FIG. 1.

FIG. 3 is a front view with an encasing hood over the subject assembly.

FIG. 4 is a side view showing internal working components of the present invention.

FIG. 5 is an opposite side view from that of FIG. 4.

FIGS. 6, 7 and 8 show details of a drive assembly associated with reciprocal movement of a delivery head portion of the present assembly in successive steps.

FIG. 9 is a detailed end view of one pocket on a packet carrying member of the present invention.

FIG. 10 is the structure of FIG. 9 in partial section showing delivery of the packets to the individual pockets.

FIG. 11 is a top view of a delivery head portion.

FIG. 12 is a sectional view along line 12—12 of FIG. 11.

FIG. 13 is a bottom view along line 13—13 of FIG. 12.

FIG. 14 is an end view of a strainer component associated with the delivery head.

FIG. 15 is a sectional view along line 15—15 of FIG. 14.

FIG. 16 is a top view of a preformed packet of granulated or like material contained therein.

FIG. 17 is a sectional view along line 17—17 of FIG. 16.

FIG. 18 is a sectional view of a packet formed within a supporting pocket on the packet carrying member with the delivery head in an engaging, operative position.

Like reference numerals refer to like parts throughout the several views of the drawings.

DETAILED DESCRIPTION OF THE PREFERRED EMBODIMENT

Figures 19, 20, 21, 22, 23, 24, 25:
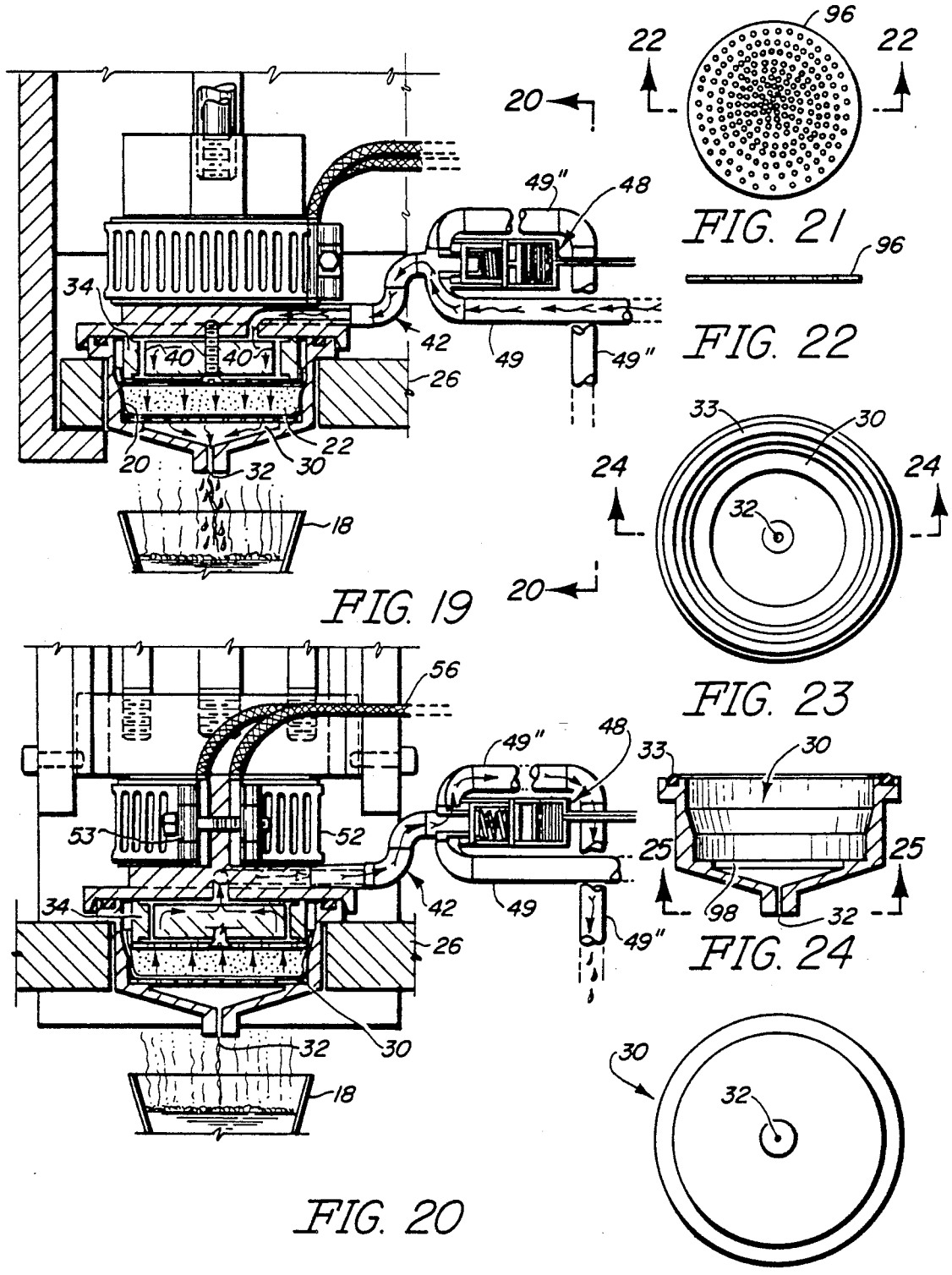
FIG. 19 is a sectional view showing the delivery of fluid through the fluid delivery structure for passage of the liquid through the packet and into the receiving container.
FIG. 20 is the structure of FIG. 19 wherein excess or waste moisture or like fluid is removed from the packet.
FIG. 21 is a strainer member associated with each of the pockets as shown in FIGS. 19 and 20.
FIG. 22 is a sectional view along line 22—22 of FIG. 21.
FIG. 23 is a top view of each of the pockets showing interior features thereof.
FIG. 24 is a sectional view of the embodiment of FIG. 23 along line 24—24 thereof.
FIG. 25 is a bottom view along line 25—25 of FIG. 24.

The present invention relates to an automatic or at least semi-automatic coffee making machine. It is to be emphasized that while the explanation of the subject assembly is made with reference to the making of a coffee beverage, the basic components could still be utilized in the manner described an other beverages could in fact be made.

The subject assembly comprises a housing generally indicated as 10 having a facing control panel 12 with any type of applicable digital or other conventional controls as at 13 in the form of push buttons or the like for the determination of the number of containers of coffee to be "automatically" prepared. The control panel or facing panel 12 as well as the operable components 13 serve to activate a control means generally indicated as 14, to be described in greater detail hereinafter specifically with reference to the operation of the subject assembly. However, the control means does include a timer means and a switching means preferably in the form of a plurality of micro switches which are activated upon certain movement of the components of the subject assembly which in turn activate the timer and control the various operations of the machine, again to be described in greater detail hereinafter.

The subject assembly is designed to form a liquid beverage into individual servings and deliver such servings into individual containers as at 18. In the utilization of the present assembly, a plurality of preformed packets 20 hold the material for making the liquid beverage in granulated, powdered or like form as at 22. The saturation of the material 22 with water or any other applicable liquid serves to form the coffee-type beverage wherein the coffee beverage is eventually delivered to the individual containers 18. Therefore, in the operation of the subject assembly a packet carrying member 24 in the form of a rotatable plate 26 is rotatably mounted on the housing. Similarly, and in cooperation therewith, a container carrying member in the form of a plate 28 is also rotatably mounted on the housing 10 in synchronization with the plate 26. It should be noted that in each of the plates or carrying members 26 and 28, a first plurality of pockets and a second plurality of pockets are respectively formed. The first plurality of pockets are shown in somewhat greater detail, individually, in FIG. 9 and indicated as 30. Each of the pockets has a hollow interior configuration with an open end as at 32 substantially in the form of a funnel so as to direct the liquid beverage formed directly into one of the containers 18 located immediately below the pockets as shown in FIGS. 2 and 3. Further, each of the pockets are designed to removably receive and maintain therein one of the beverage forming material preformed packets 20 (see FIGS. 18, 19 and 20). Features of the pockets 30 may include an outer ring-type seal as at 33 which serves to cooperate with a delivery head generally indicated as 34 to be explained in greater detail hereinafter. Since the packet carrying member 26 and the container carrying member 28 rotate in synchronization with one another, each of the containers 18 are located immediately beneath and in fluid receiving relation to one of the first plurality of pockets 30 and more specifically are positioned to receive formed beverage from the funnel-like exit or open end 32 of each of such pockets. The containers 18 are maintained on the container carrying member 28 or plate by a second plurality of pockets formed therein for purposes of retaining the containers as shown in FIGS. 2 and 3.

The individual preformed packets 20 are delivered independently and successively to each of the pockets 30 by means of a delivery shoot or sleeve as at 36. Therefore, the delivery shoot 36 can hold a plurality of such packets 20 in a stack-like configuration as best shown in FIG. 10. Regulation of delivery in the preferred, predetermined manner can readily occur as the pockets 32 pass beneath and in receiving relation to the supply shoot or sleeve 36.

Further with regard to the packet 20, coffee 22 is of course contained therein in granulated form and a lid 20' is sufficiently porous to allow water under relatively high pressure and temperature to be forced therethrough. In order to maintain the structural integrity of the packet during the exposure to pressurized water at a high temperature, the material from which the packet is formed is a high tech plastic type moldable material which is sufficiently porous to allow the water to pass therethrough. Further, the lid portion 20' is connected to the remainder of the packet 20 by heat welding along all connecting seams and/or junction lines in order to further add to the structural integrity of the packet so that it may withstand the pressures exerted thereon during the compression of the packet when the water flows therethrough.

With regard to FIGS. 6 through 8, 12, 13, and 18 through 20, an important feature of the present invention is the provision of a reciprocally mounted delivery head 34. This delivery head forms part of a fluid delivery means to accomplish the delivery of liquid to each of the packets for saturation thereof and while the packets 20 are in their individual pockets 30 in order that the delivered liquid passes through the packets 20 and into the individual aligned containers 18. The delivery head includes a plurality of integrally formed internal channels each interconnected as at 40 with received liquid from a conduit means 42 such that liquid passes through the interior of the delivery head 34 and outwardly from a bottom exposed end thereof as at 42 into an exposed face 20' of the packet and into the interior thereof for saturation of the material 22. Each of the packets are formed of a material which allows the liquid to readily pass therethrough when saturating the contents 22. A strainer or filter-type mechanism as at 44 may fit over the exposed delivery end 42 of the delivery head 34 so as to filter out any type of debris or unwanted substance from contact with the exposed face 20' of each of the packets.

The fluid delivery means further comprises a flow regulating valve assembly 48 connected to the conduit means 42 and serving to regulate fluid flow along a conduit section 49 from a supply of liquid, which may be conventional, as at 50. A liquid pump 52 serves to force liquid flow along the conduit means 42 and particularly conduit section 49 passed the regulating valve 48 and to and through the delivery head 34. The delivery head 34 has a first heater assembly maintained in heat transferring relation to an outer surface portion thereof as at 35. Such heater element is a strip-type heater maintained by a tension belt or the like 52 connected in surrounding relation about the outer surface and concentrically thereto by means of a connector assembly 53 attached to the retaining belt 52. Electrical conductors as at 56 are supplied to provide electrical power to the strip type heater located beneath the retaining belt 52 and in direct heat transferring relation to the outer surface of the portion 35 of the delivery head 34. The delivery head 34 is made from a heat conducting material such as metal and due to its integral and/or one piece construction serves to heat the water passing through the individual channels 40.

A second heating assembly is located as at 58 (see FIG. 5). This "preheater" is provided to initially heat the water as it is forced by pump 52 and as it enters the housing 10 through the inlet from the liquid supply as at 50. The conduit means 42 and particularly conduit section 49 is connected to deliver the preheated water from the second heater means 58 directly to the delivery head 34.

With reference to FIGS. 6, 7 and 8, a first drive means 59 includes drive motor 61 and provides the reciprocal movement of the delivery head 34 into and out of confronting, engaging and somewhat compressing relation to the individual packets 20 as they are aligned immediately beneath the delivery head 34 due to synchronized and predetermined rotation of the packet carrying member 26. The first drive means includes a rotating cam 60 engaging a roller type cam rider 62 which is connected to a support frame 64. The delivery head 34 is mounted by connectors 66 such as bolts directly into internally threaded receiving apertures 66' such that reciprocal movement of the frame 64 due to interengagement of the cam rider 62 with the periphery of the rotating cam will cause a reciprocal vertical positioning of the delivery head 34 into and out of what may be referred to as an engaging position.

Such engaging position is clearly demonstrated in FIGS. 8 and 18 through 20. It should be noted that biasing springs 68 are mounted so as to normally bias the support frame 64 and the attached cam rider 62 into a non-engaging position where the delivery head 34 is spaced upwardly from the packet 20 and/or packet carrying member or plate 26. Accordingly, upon rotation of the cam member into its "downstroke" the delivery head 34 will be forced into the aforementioned engaging position such that is exposed face 42 (see FIG. 12) engages the exposed outer surface or portion 20' and provides a certain amount of compression thereon. The actual determination of when the delivery head 34 passes into its engaging position as shown in FIG. 8 from its non-engaging position as shown in FIG. 7 is determined by the control means which, as set forth above, includes certain micro switches and timer assemblies. In addition, the length of the time that the delivery head 34 is in the aforementioned engaging position is also determined by such control means all of which will be explained in greater detail hereinafter.

A second drive means is indicated as at 70 and serves to drive a drive pulley 72 connected to a driven pulley 74 by an interconnecting drive belt 76. Activation of the drive motor 70 serves to rotate, in synchronization, both the rotatable plates 26 and 28 carrying the packets 20 and the containers 18 respectively. Both are driven in the synchronized fashion set forth above by virtue of an interconnection through a rotatable connecting shaft as at 78. Therefore, it should be evident that the delivery head 34 is periodically reciprocated downwardly into its engaging position as shown in FIGS. 18 through 20 during which time water is delivered to the packets 20 for saturation of the material 22 (see FIG. 19) wherein the water passes through the packets 20, material 22 and out through the bottom of the pockets 30 by means of a nozzle-like structure 32.

With reference to FIG. 20, once the liquid has stopped flowing through conduit 42 from the liquid supply 50 and effectively passed through the saturated material 22, the delivery head 34 is maintained in its downwardly engaging position so as to effectively remove any excess moisture, steam or the like and pass it through conduit section 49" conduit means 42 down to a drain or collection facility 79 as shown in FIGS. 2, 4 and 5. The delivery head is then moved up to its non-engaging position (see FIG. 7) upon the rotation of the cam 60 of the first drive mans 59 after sufficient time has elapsed which has been preset and regulated by the control means generally indicated as 14.

In the removal of the excess moisture, the regulating valve 48 (see FIGS. 19 and 20) may be in the form of a solenoid operated valve and is moved to its open position to close the conduit segment 49 and open the conduit segment 49" allowing the retrieved and waste moisture or steam-like fluid to pass through conduit means 42 and through the conduit section 49" into the drain or collection facility 79 (see FIGS. 2, 4 and 5).

It should also be noted that the aforementioned control means through the provided timer means and switching means serves to regulate the amount of liquid flow passing from the liquid inlet 50 through the controlled activation or operation of the pump means 52. Therefore, the time of liquid flow from the supply inlet 50 to the delivery head and therefrom into the individual packets 20 is regulated as well as the amount of liquid flowing thereto Such is regulated by the aforementioned control means. The control means includes a timing means and a switching means. These in turn are defined by a first micro switch structure 80 powered by a conventional power source through a conductor 82 and carried on the support frame 64 so as to reciprocate with the delivery head 34. An activating button 84 serves to trick the micro switch 80 which in turn controls a first timer means. The first timer means in turn regulates the activation of the drive motor 61 and determines the instigation of the downward stroke of the delivery head 30 and how much time the delivery head 30 is maintained in the engaging position as shown in FIGS. 19 and 20. Such time must be sufficient to allow the delivery of liquid through the activation of the pump means 52 from the liquid supply 50 into and through the delivery head 34. Further, such time must be sufficient to allow the withdrawal of any waste fluid as explained with regard to FIG. 20.

A second micro switch or switching means is connected to or formed on the rotating packet carrying member or plate 26 in the form of a plurality of peripheral cutouts or notches as at 88. These notches serve to trip a second micro switch generally indicated as 90 which activates a timer mechanism for control of the pump means which, as set forth above, regulates the amount of time the pump means 52 is activated and therefore the amount of fluid passing from the fluid inlet 50.

Other features of the present invention include the provision of a second strainer or like member 96 disposed to fit within a bottom-most receiving slot 98 on each of the packet receiving pockets 30 as shown in FIGS. 21, 22 and 24.

Now that the invention has been described,
What is claimed is:

1. An automatic coffee making assembly designed to use preformed packets of coffee, said assembly comprising:
    a) a housing including a movably mounted packet carrying member structured to hold a plurality of packets thereon and a container carrying member structured to support a plurality of containers in aligned liquid receiving relation to a different one of the packets,
    b) a delivery head reciprocally mounted on said housing and movable into and out of an engaging position successively with each of the plurality of packets,
    c) fluid delivery means formed at least in part within said delivery head for the delivery of liquid through each of the packets with the resulting formation of coffee thereby, said fluid delivery means connected to a liquid supply and including valve means regulating fluid flow from said liquid supply to said delivery head and from said delivery head to a drain facility;
    d) pump means mounted on said housing in driving relation to liquid from said liquid supply to said delivery head through said valve means,
    e) a first drive means for successively positioning said packet carrying member and said container carrying member as well as the packets and containers thereon in operative communication with said delivery head, and
    f) control means including a switching means and a timer means cooperatively connected to synchronize reciprocal movement of said delivery head into and out of said engaging position with successively positioned packets aligned therewith and activation of said pump means to deliver liquid to said delivery head.

2. An assembly as in claim 1 wherein said fluid delivery means includes a plurality of channels integrally formed in said delivery head in receiving relation to liquid from said pump means and liquid supply and an exposed end on said delivery head, said exposed end disposed to engage each of the aligned packets successively upon their operative position with said delivery head to define said engaging position.

3. An assembly as in claim 2 wherein said delivery means is further structured to withdraw fluid from an aligned packet and said valve means positionable between a fluid delivering position and a fluid withdrawing position.

4. An assembly as in claim 3 wherein said fluid withdrawing position of said valve means is defined by confronting engagement of said exposed end of said delivery head with the aligned packet and positioning of said valve means in an open position, whereby fluid is directed out of the packet through said valve means to said drain facility.

5. An assembly as in claim 2 wherein said fluid delivery means comprises a conduit means disposed in interconnecting relation between said liquid supply and said plurality of channels formed in said delivery head and further disposed in interconnecting relation between said delivery head and said drain facility for directing fluid to and from said delivery head.

6. An assembly as in claim 7 wherein said valve means is connected to said conduit means in fluid regulating relation between said delivery head and said drain facility and said liquid supply and said delivery head.

7. An assembly as in claim 1 wherein said packet carrying member comprises a first plate rotatably mounted on said housing and including a first plurality of receiving pockets formed in spaced relation thereon, each of said first pockets dimensioned to removably receive a packet therein and allow liquid to pass therethrough and the packet therein into an aligned container.

8. An assembly as in claim 7 wherein said container carrying member comprises a second plate rotatably mounted beneath said first plate and connected to rotate in synchronization with said first plate; said second plate including a plurality of second receiving pockets formed in spaced relation to one another and in aligned relation to said first plurality of pockets and each of said second plurality of pockets structured to removably receive a container therein.

9. An assembly as in claim 1 further comprising heating means mounted on said housing in heat conveying relation to liquid passing from the liquid supply to the delivery head for the heating of the liquid prior to passing through each of said packets.

10. An assembly as in claim 9 wherein said heating means comprises a first heating assembly mounted in heat conducting and transferring relation on said delivery head, said delivery head formed of a heat conductive material and cooperatively structured with said first heat conducting assembly to heat liquid passing through said delivery head into an aligned packet on said packet carrying member.

11. An assembly as in claim 10 wherein said first heating assembly is disposed in surrounding, confronting relation to an exterior surface of said delivery head.

12. An assembly as in claim 10 wherein said heating means comprises a second heating assembly mounted on said housing in heat transferring relation to liquid passing from the liquid supply downstream of said pump means.

13. An assembly as in claim 1 wherein said control means comprises a first timer means connected to said second drive means for regulating the length of time said delivery head is in said engaging position and a second timer means structured to regulate actuation of said pump means and liquid flow from the liquid supply to the delivery head.

14. An assembly as in claim 13 wherein said control means further comprises a first switch means connected to said first timer means for actuation thereof and a second switch means mounted and structured to activate said second timer.

15. An assembly as in claim 14 wherein said first switch means is mounted in activating relation to movement of said packet carrying member, successive movement of said packet carrying member for positioning of each packet successively into aligned operative position relative to said delivery head serving to independently activate said first switch means.

16. An assembly as in claim 15 wherein said second switch means is mounted in cooperative relation to said first drive means and is activatable successively upon successive reciprocal movement of said delivery head into said engaging position.

* * * * *